(12) United States Patent
Chiou

(10) Patent No.: US 7,035,339 B2
(45) Date of Patent: Apr. 25, 2006

(54) CARRIER RECOVERY APPARATUS FOR DIGITAL QAM RECEIVERS

(75) Inventor: Rong-Liang Chiou, Taipei (TW)

(73) Assignee: Silicon Integrated Systems Corp., (TW)

( * ) Notice: Subject to any disclaimer, the term of this patent is extended or adjusted under 35 U.S.C. 154(b) by 850 days.

(21) Appl. No.: 10/137,285

(22) Filed: May 3, 2002

(65) Prior Publication Data

US 2003/0206052 A1 Nov. 6, 2003

(51) Int. Cl.
*H04L 5/12* (2006.01)
*H04L 27/14* (2006.01)

(52) U.S. Cl. ...................... 375/261; 375/326
(58) Field of Classification Search ............ 375/261, 375/326, 327, 354, 371, 373–376; 329/300–308
See application file for complete search history.

(56) References Cited

U.S. PATENT DOCUMENTS

| 5,058,136 A | 10/1991 | Kazecki et al. | |
| 5,519,356 A | 5/1996 | Greenberg | |
| 5,612,975 A * | 3/1997 | Becker et al. | 375/319 |
| 5,619,154 A * | 4/1997 | Strolle et al. | 327/129 |
| 5,878,088 A * | 3/1999 | Knutson et al. | 375/324 |
| 5,940,450 A | 8/1999 | Koslov et al. | |
| 6,023,491 A * | 2/2000 | Saka et al. | 375/326 |

* cited by examiner

*Primary Examiner*—Don N. Vo
(74) *Attorney, Agent, or Firm*—Lowe Hauptman & Berner, LLP

(57) ABSTRACT

A carrier recovery apparatus for digital Quadrature Amplitude Modulation (QAM) receivers is disclosed. The carrier recovery apparatus includes a phase detector, a lock controller, a frequency locker and a phase loop filter, and provide phase/frequency error information for a numerically controlled oscillator (NCO) to generate recovered carrier frequency. The phase detector detects the symbol energy information and the phase error information of the extracted symbols from the I/Q extractor. The lock controller monitors the symbol energy from the phase detector, separates the extracted symbols into two groups: valid and non-valid, and outputs the control flag of valid symbols into both the frequency locker and the phase loop filter. To achieve a wide range acquisition and a good tracking performance, the lock controller controls the operation of the frequency locker and the phase loop filter in three operations. The detected frequency offset from the frequency locker and the phase offset detected from the phase loop filter are both fed into the NCO to recover the carrier offset.

21 Claims, 15 Drawing Sheets

US 7,035,339 B2

CARRIER RECOVERY APPARATUS FOR DIGITAL QAM RECEIVERS

FIELD OF THE INVENTION

The present invention relates to a carrier recovery apparatus for use in a receiving system or IC, and more particularly to a carrier recovery apparatus for use in a Quadrature Amplitude Modulation (QAM) receiver

BACKGROUND OF THE INVENTION

In a communication system, frequency and phase offsets always exist between the local oscillators of the transmitting and receiving sides. In a Quadrature Amplitude Modulation (QAM) system, the carrier offset induces rotation and tilt to the signal constellation, and such situation destroys the signal severely.

Please refer to FIGS. 1A~1C which schematically show three types of signal constellation plots of demodulated QAM-16 signals, respectively, wherein FIG. 1A shows an ideal signal constellation, FIG. 1B shows a signal constellation tilting due to phase deviation between the transmitter and receiver ends, and FIG. 1C shows a signal constellation rotating due to additional frequency deviation between the transmitter and receiver ends. When the signal constellation of the demodulated signals is distorted as shown in FIG. 1B or 1C, the demodulated signals cannot be properly decoded to realize the original information Therefore, efforts have been made to solve these problems.

Please refer to FIG. 2 which is a functional block diagram of a conventional QAM receiver The received RF signals are converted into IF (Intermediate Frequency) signals by a tuner 11, and then sampled and digitized by an analog-to-digital (A/D) converter 12 with a sampling interval T. The digitized IF samples are further converted into baseband by a voltage controlled oscillator (VCO) 13, and then proper filtered to remove undesired high frequency components. Thus the received signals are demodulated. However, when the phase offset exists between the central frequency of the VCO 13 and that of the carrier at IF, a cross talk occurs between the in-phase channel and the quadrature channel of the basedband signal. A carrier recovery apparatus 14 is used to estimate the $\Delta\theta[n]$ so that the VCO 13 can adjust its phase according to such carrier information to eliminate the cross talk of the baseband samples. Such conventional carrier recovery method, for example that disclosed in U.S. Pat. Nos. 5,058,136, 5,519,356 or 5,940,450, provide parameters essentially relevant to phase deviation to modify the local oscillator at the receiver end so as to eliminate the phase deviation. If any frequency deviation exists, however, more parameters and modifying steps will be required to work on the phase deviation in order to eliminate both of the phase and frequency deviation problems. Therefore, it will take a lot of time to complete the modification and converge the system. Further, it is difficult to balance the modifying rate and the resulting precision.

SUMMARY OF THE INVENTION

An object of the present invention is to provide a carrier recovery apparatus to eliminate both of the phase and frequency deviation problems with balanced modifying rate and resulting precision.

The present invention relates to a carrier recovery apparatus for use at a demodulating end of a communication system. In a preferred embodiment, the carrier recovery apparatus is used in a Quadrature Amplitude Modulation (QAM) receiver for recovering the carrier.

In a first aspect, the carrier recovery apparatus includes a phase detector detecting a first and a second components of a signal to be demodulated, and outputting a phase error parameter according to a correlation between the first and second components; a frequency locker electrically connected to the phase detector, generating a frequency adjusting value and an estimated frequency error value in response to the phase error parameter; and a lock controller electrically connected to the frequency locker, outputting a first flag status signal to the frequency locker according to a comparing result of the frequency adjusting value with a first threshold value, and controlling a changing status of the estimated frequency error value in response to the first flag status signal, the estimated frequency error value being processed according to the changing status and provided for a carrier frequency generator at the demodulating end of the communication system to generate a recovered carrier.

Preferably, the phase detector further outputs a power parameter to the locker controller in response to the first and second components of the QAM signal, and outputs a second flag status signal according to a comparing result of the power parameter with a second threshold value, and the second flag status signal indicates a valid status when the power parameter is no less than the second threshold value.

Preferably, the frequency adjusting value is not compared with the first threshold value until the second flag status signal indicates the valid status.

Preferably, the carrier recovery apparatus further includes a phase loop filter electrically connected to the phase detector and the lock controller, outputting an estimated phase error value in response to the phase error parameter, and receiving a third flag status signal from the lock controller according to a comparing result of the frequency adjusting value with a third threshold value to control a changing status of the estimated phase error value.

Likewise, it is preferred that the frequency adjusting value is not compared with the third threshold value until the second flag status signal indicates the valid status.

In an embodiment, the third threshold value is greater than the first threshold value. The first flag status signal indicates an enabled status of the frequency locker when the frequency adjusting value is greater than the first threshold value, and indicates a disabled status of the frequency locker when the frequency adjusting value is no greater than the first threshold value. The third flag status signal indicates an enabled status of the phase loop filter when the frequency adjusting value is no greater than the third threshold value, and indicates a disabled status of the phase loop filter when the frequency adjusting value is greater than the third threshold value.

The changing status of the estimated frequency error value indicates that the estimated frequency error value holds at a previous value when the first flag status signal indicates the disabled status of the frequency locker. On the contrary, the changing status of the estimated frequency error value indicates that the estimated frequency error value is updated by incorporating therein a factor of the frequency adjusting value when the first flag status signal indicates the enabled status of the frequency locker.

Preferably, the frequency locker farther outputs an average frequency error according to a comparing result of the phase error parameter with a fourth threshold value. The frequency locker includes a counter, and generates the estimated frequency error value in response to the frequency adjusting value and a sign of the average frequency error while the counter counts up to a pre-defined value. The frequency adjusting value is doubled when three consecutive average frequency errors outputted by the phase detector have the same sign, and reduced to a half when the three consecutive average errors have alternate signs.

On the other hand, the changing status of the estimated phase error value indicates that the estimated phase error value holds at a previous value when the third flag status signal indicates the disabled status of the phase loop filter. On the contrary, the changing status of the estimated phase error value indicates that the estimated phase error value is updated by incorporating therein a factor of an acquisition bandwidth inputted into the phase loop filter when the third flag status signal indicates the enabled status of the phase loop filter.

Preferably, the phase loop filter includes a one-order filter electrically connected to the phase detector for receiving the phase error parameter, and processing the phase error parameter and the acquisition bandwidth into an updated estimated phase error value; and a multiplexer electrically connected to the one-order filter, and allowing one of the held estimated phase error value and the updated estimated phase error value to be outputted in response to the second and third flag status signals.

Preferably, the carrier frequency generator is a numerically controlled oscillator (NCO).

In a second aspect, a carrier recovery apparatus for use in a Quadrature Amplitude Modulation (QAM) receiver, which includes a phase detector outputting a phase error parameter in response to an in-phase and a quadrature components of a QAM signal; a frequency locker electrically connected to the phase detector, generating a frequency adjusting value and an estimated frequency error value in response to the phase error parameter; a phase loop filter electrically connected to the phase detector, outputting an estimated phase error value in response to the phase error parameter; and a lock controller electrically connected to the frequency locker and the phase loop filter, outputting a first flag status signal to the frequency locker according to a comparing result of the frequency adjusting value with a first threshold value, and outputting a second flag status signal to the phase loop filter according to a comparing result of the frequency adjusting value with a second threshold value in order to control a first changing status of the estimated frequency error value in response to the first flag status signal, and control a second changing status of the estimated phase error value in response to the second flag status, wherein the estimated frequency error value and estimated phase error value are processed according to the first and second changing status, respectively, and provided for a carrier frequency generator at the demodulating end of the communication system to generate a recovered carrier.

Preferably, phase detector further outputs a power parameter to the locker controller in response to the in-phase and quadrature components of the QAM signal, and outputs a third flag status signal according to a comparing result of the power parameter with a third threshold value, the third flag status signal indicates a valid status when the power parameter is no less than the third threshold value, and the frequency adjusting value is not compared with the first threshold value until the third flag status signal indicates the valid status.

DETAILED DESCRIPTION OF THE INVENTION

As mentioned above, the constellation of Quadrature Amplitude Modulation signals will tilt or rotate if it suffers phase offset or frequency offset. In other words, the in-phase symbol 'I' and the quadrature symbol 'Q' extracted from the I/Q extractor of a digital QAM receiver may cross talk to each other and therefore degrade the performance whenever phase offset or frequency offset exists. Therefore, a carrier recovery apparatus must detect the frequency and phase offsets between the local oscillators at the transmitting and receiving sides to compensate the rotation of the signal constellation.

Figure 1A:
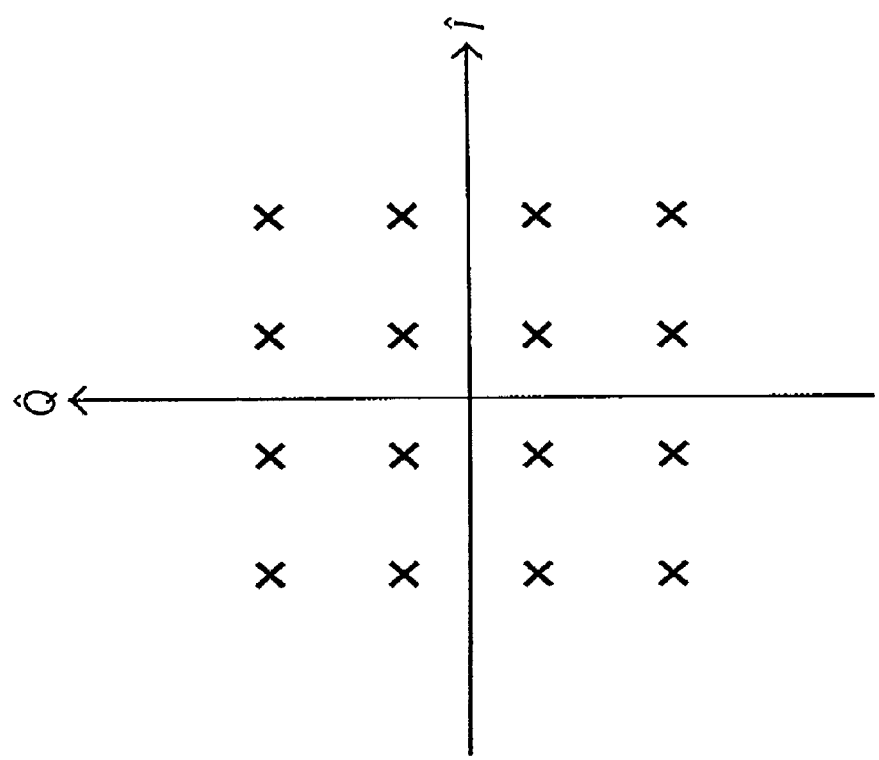
FIGS. 1A~1C are schematic plots showing three types of signal constellation of demodulated QAM-16 signals, respectively.
Figure 1B:
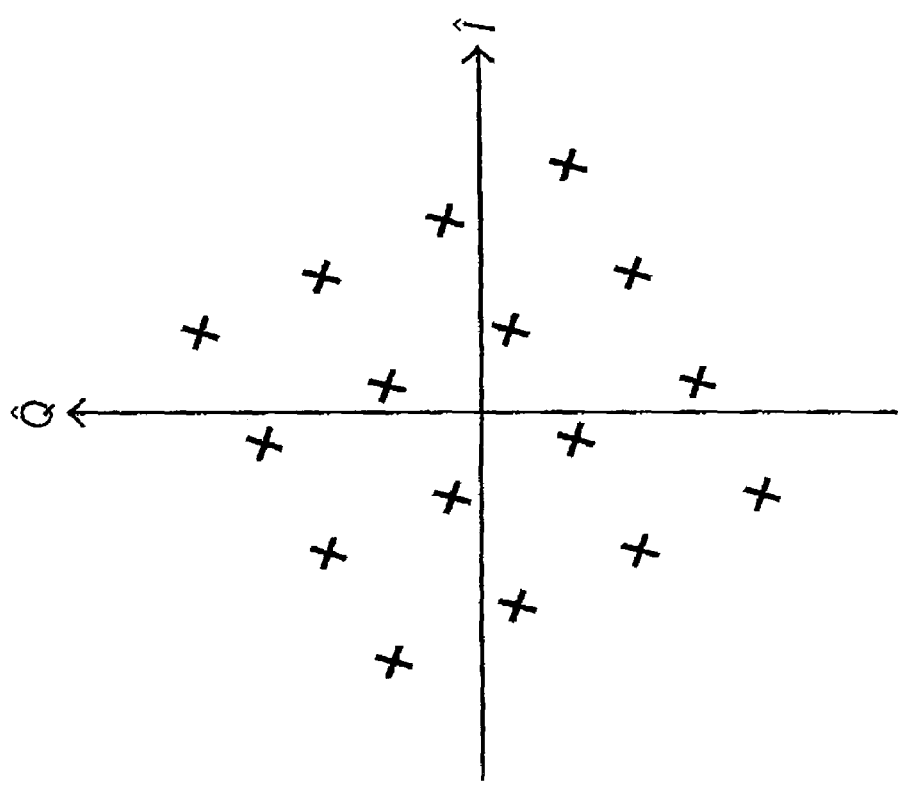
Figure 1C:
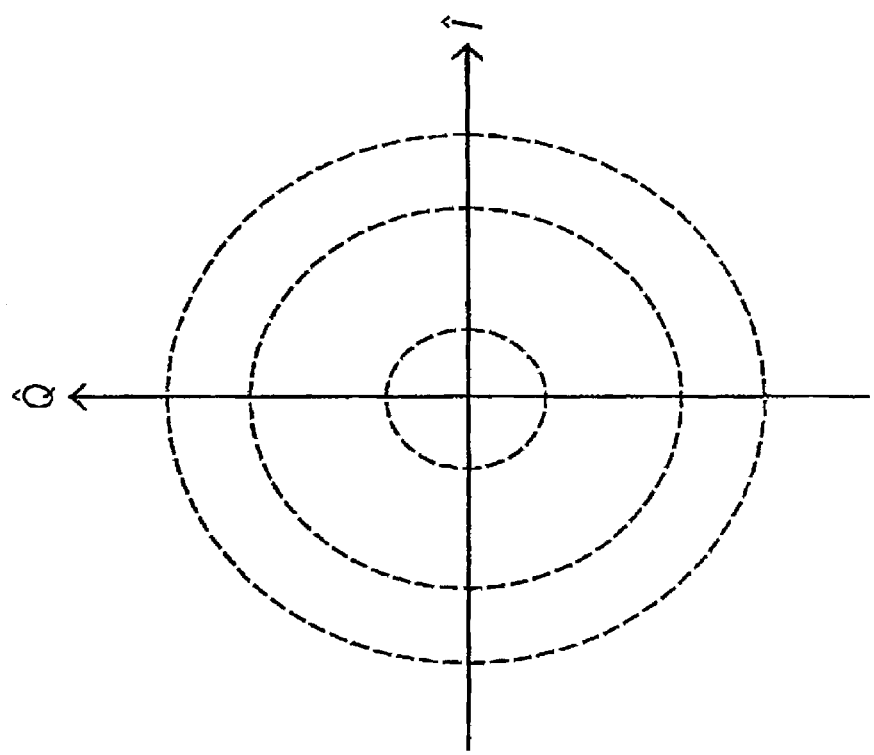
Figure 2:
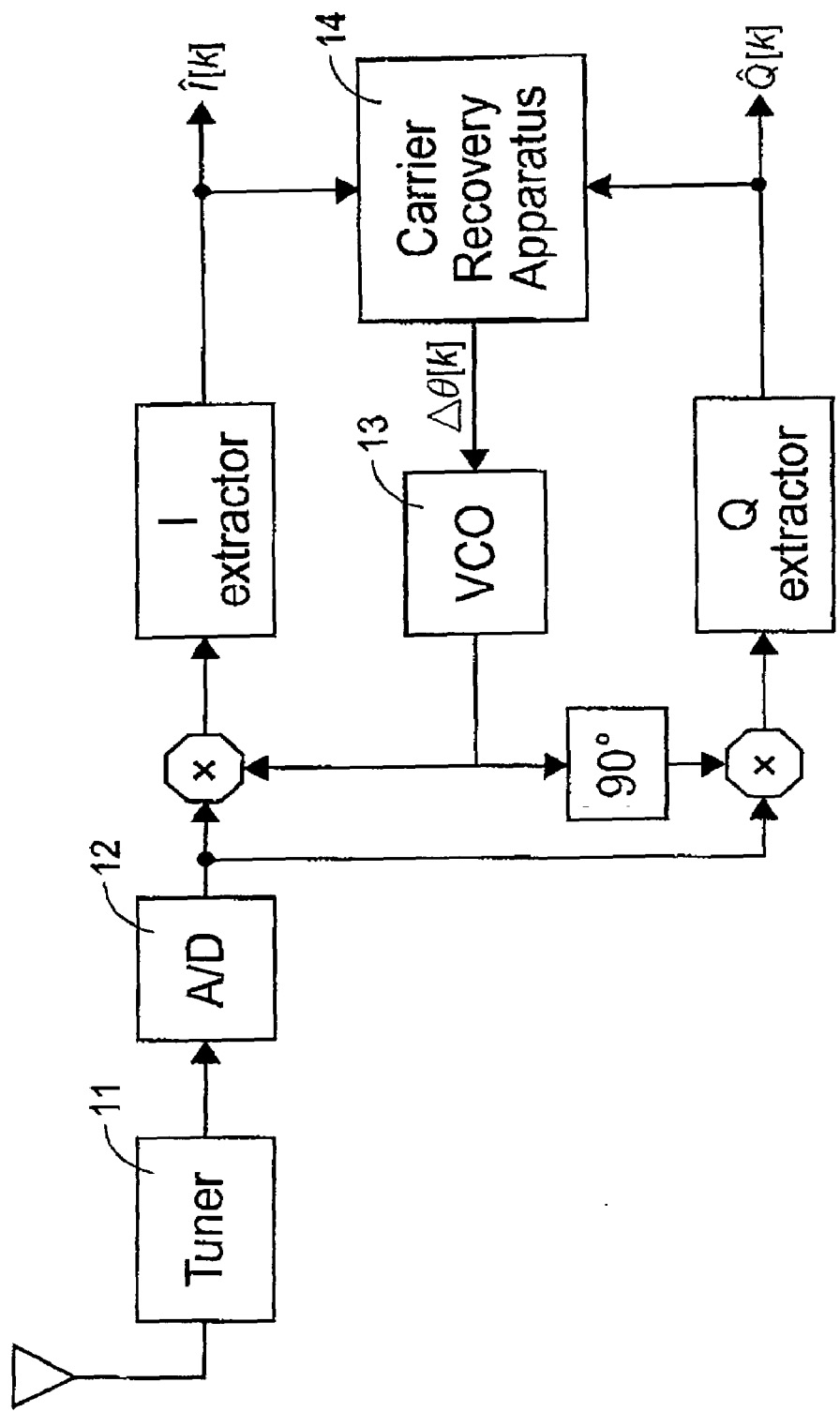
FIG. 2 is a functional block diagram of a conventional QAM receiver.
Figure 3:
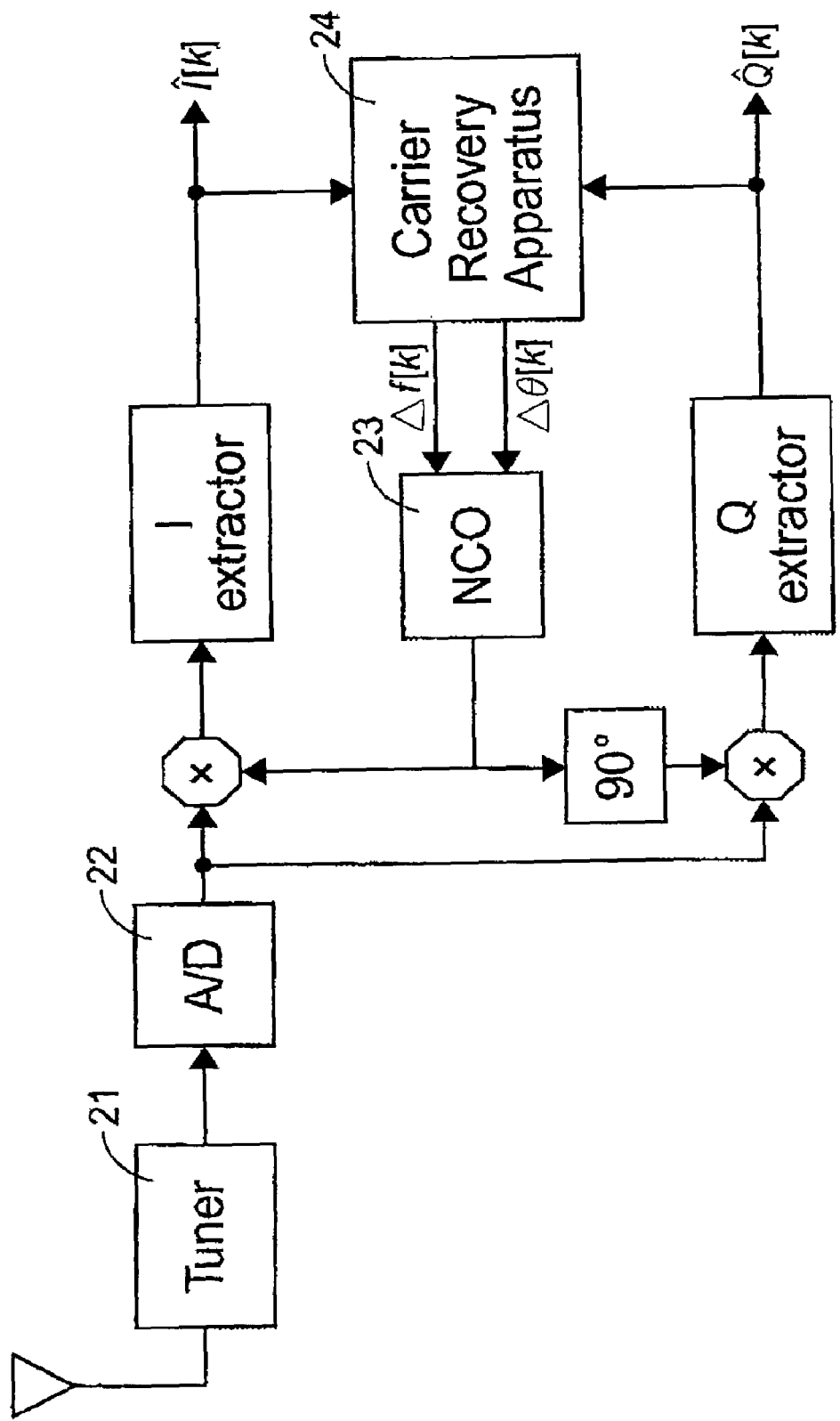
FIG. 3 is a functional block diagram of a QAM receiver according to the present invention.

The effect of carrier offsets is firstly expressed. Please refer to FIG. 3 which is a functional block diagram of a QAM receiver according to the present invention. The QAM receiver includes a tuner 21 down converts the received RF signals into IF (Intermediate Frequency) signals, and then an A/D converter 22 samples and digitizes such signals to discrete ones with the sampling time T. Each digitized sample x[n] can be regarded as $x[n]=Re\{(I[n]+jQ[n]) \cdot e^{j2\pi f_c nT}\}$, where fc is the central frequency of the IF carrier. A numerically controlled oscillator (NCO) 23 further down converts the digitized IF samples into baseband, followed by proper filtering to reject the unwanted high frequency components. The filtered signals can be converted to have a new sampling rate according to the system baud rate in index k, and thus the estimated symbols ($\hat{I}[k]$, $\hat{Q}[k]$) are demodulated. However, when the frequency offset $\Delta f[n]$ and the phase offset exist between the central frequency of the NCO and that of the carrier at IF, a cross talk occurs between the in-phase channel and the quadrature channel of the down converted basedband signal. The effect is illustrated as follows.

The digitized IF samples with carrier offsets $\Delta f[n]$ and $\Delta \theta[n]$ can be regarded as $x[n]=\text{Re}\{(I[n]+jQ[n]) \cdot e^{j[2\pi(f_c+\Delta f[n])nT+\Delta\theta[n]]}\}$, or equivalently, $$I[n]\cdot\cos[2\pi(f_c+\Delta f[n])nT+\Delta\theta[n]]-Q[n]\cdot\sin[2\pi(f_c+\Delta f[n])nT+\Delta\theta[n]]].$$

Without any carrier recovery apparatus, undesired distortion occurs such that $$I'[n]=I[n]\cdot\cos(2\pi\cdot\Delta f[n]\cdot nT+\Delta\theta[n])-Q[n]\cdot\sin(2\pi\cdot\Delta f[n]\cdot nT+\Delta\theta[n])\ Q'[n]=Q[n]\cdot\cos(2\pi\cdot\Delta f[n]\cdot nT+\Delta\theta[n])+I[n]\cdot\sin(2\pi\cdot\Delta f[n]\cdot nT+\Delta\theta[n]).$$

A carrier recovery apparatus 24 must estimate the $\Delta f[n]$ and $\Delta \theta[n]$, and thus the NCO can adjust its frequency and the phase by such carrier information to eliminate the unwanted rotation and the cross talk of the baseband samples (I[n],Q[n]).

Figure 4:
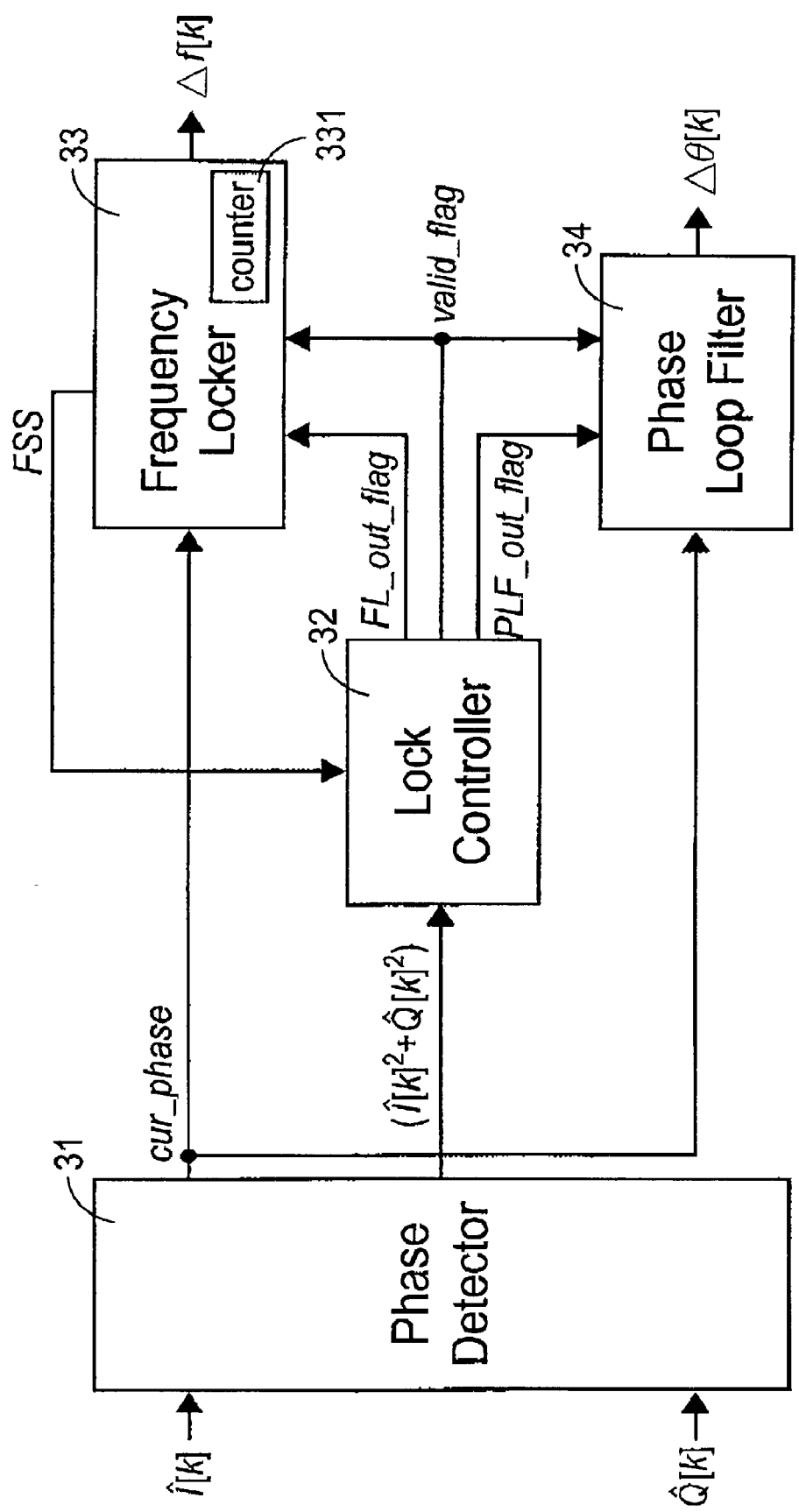
FIG. 4 is a schematic circuit block diagram showing a preferred embodiment of a carrier recovery apparatus according to the present invention.

Please refer to FIG. 4 which is a schematic functional block diagram showing a preferred embodiment of a carrier recovery apparatus according to the present invention. The carrier recovery apparatus includes a phase detector 31, a lock controller 32, a frequency locker 33, and a phase loop filter component 34. The phase detector 31 generates two kinds of information from the extracted in-phase component $\hat{I}[k]$ and quadrature component $\hat{Q}[k]$. One fed to the lock controller 32 is the detected energy of the extracted symbol ($\hat{I}[k],\hat{Q}[k]$), the other sent to the frequency locker 33 and the phase loop filter 34 is the detected phase error "cur_phase". The lock controller 32 controls the acquisition and tracking status by mastering the behavior of the frequency locker 33 and the phase loop filter 34 via control signals "FL_out_flag"/"PLF_out_flag" and "valid_flag" which will be described later. In the meanwhile, the frequency locker 33 feedbacks its working status FSS to the lock controller 32. Then, the frequency locker 33 and the phase loop filter 34 output $\Delta f[k]$ and $\Delta \theta[k]$ to the NCO 23 (FIG. 3), respectively.

Figure 5A:
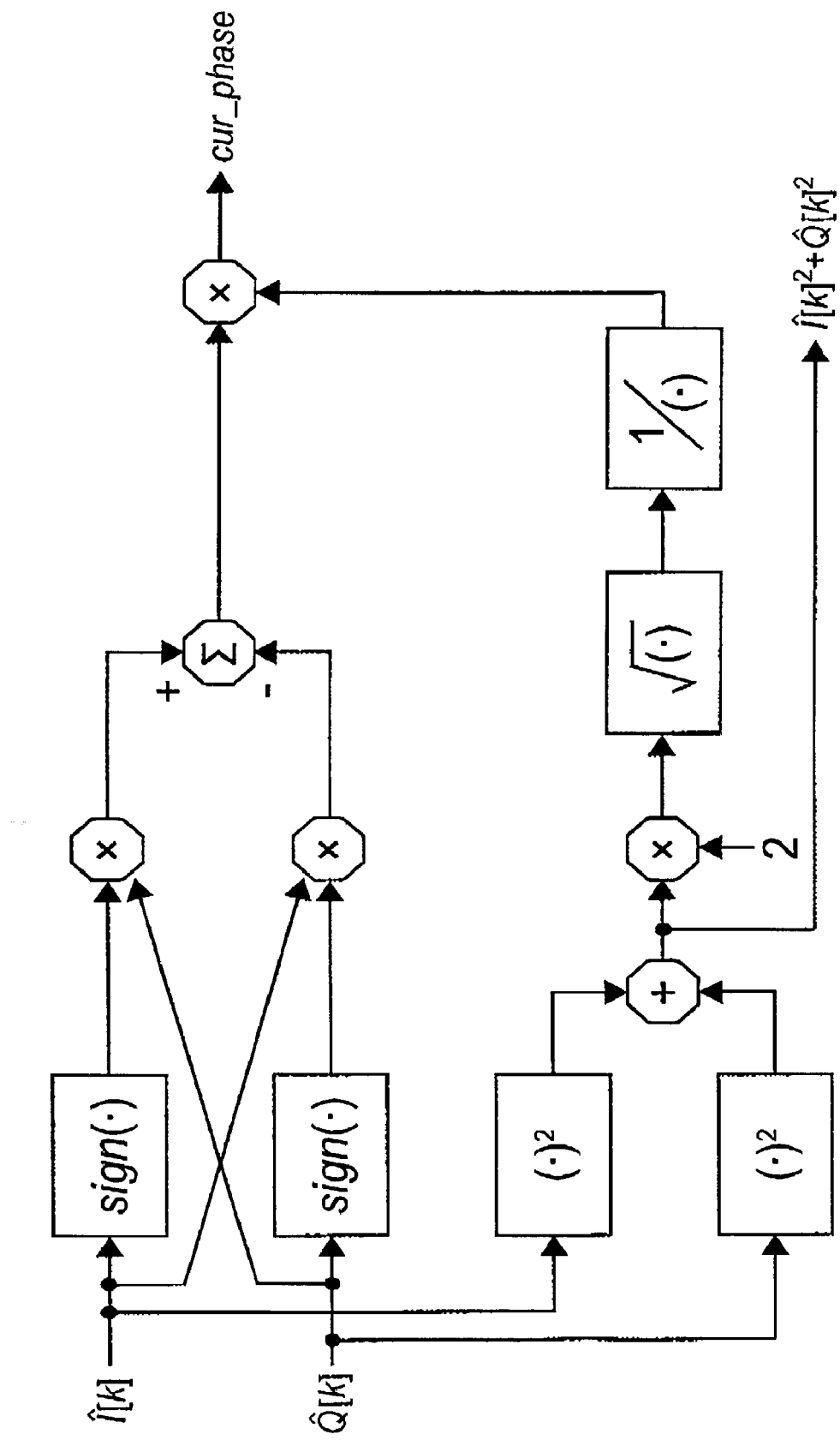
FIG. 5A which is a schematic block diagram showing a preferred embodiment of the phase detector of FIG. 4.

Now, please refer to FIG. 5A which is a schematic block diagram showing a preferred embodiment of the phase detector of FIG. 4. We can regard $\hat{I}[k]$ and $\hat{Q}[k]$ as a complex vector $\hat{I}[k]+j\hat{Q}[k]$. The quadrant that the extracted symbol locates on the constellation is identified by another complex vector $\text{sign}(\hat{I}[k])+j\cdot\text{sign}(\hat{Q}[k])$, i.e., by choosing the sign of each component of the extracted symbol. We can derive the phase relation between the two complex vectors in the following formula:

$$(\hat{I}[k]+j\hat{Q}[k])/(\text{sign}(\hat{I}[k])+j\cdot\text{sign}(\hat{Q}[k]))$$

After normalization and simplification, we choose the imaginary part as the phase error information, which is in the form of:

$$\hat{Q}[k]\cdot\text{sign}(\hat{I}[k])-\hat{I}[k]\cdot\text{sign}(\hat{Q}[k])/\sqrt{2}\cdot(\hat{I}[k]^2+\hat{Q}[k]^2)$$

Figure 5B:
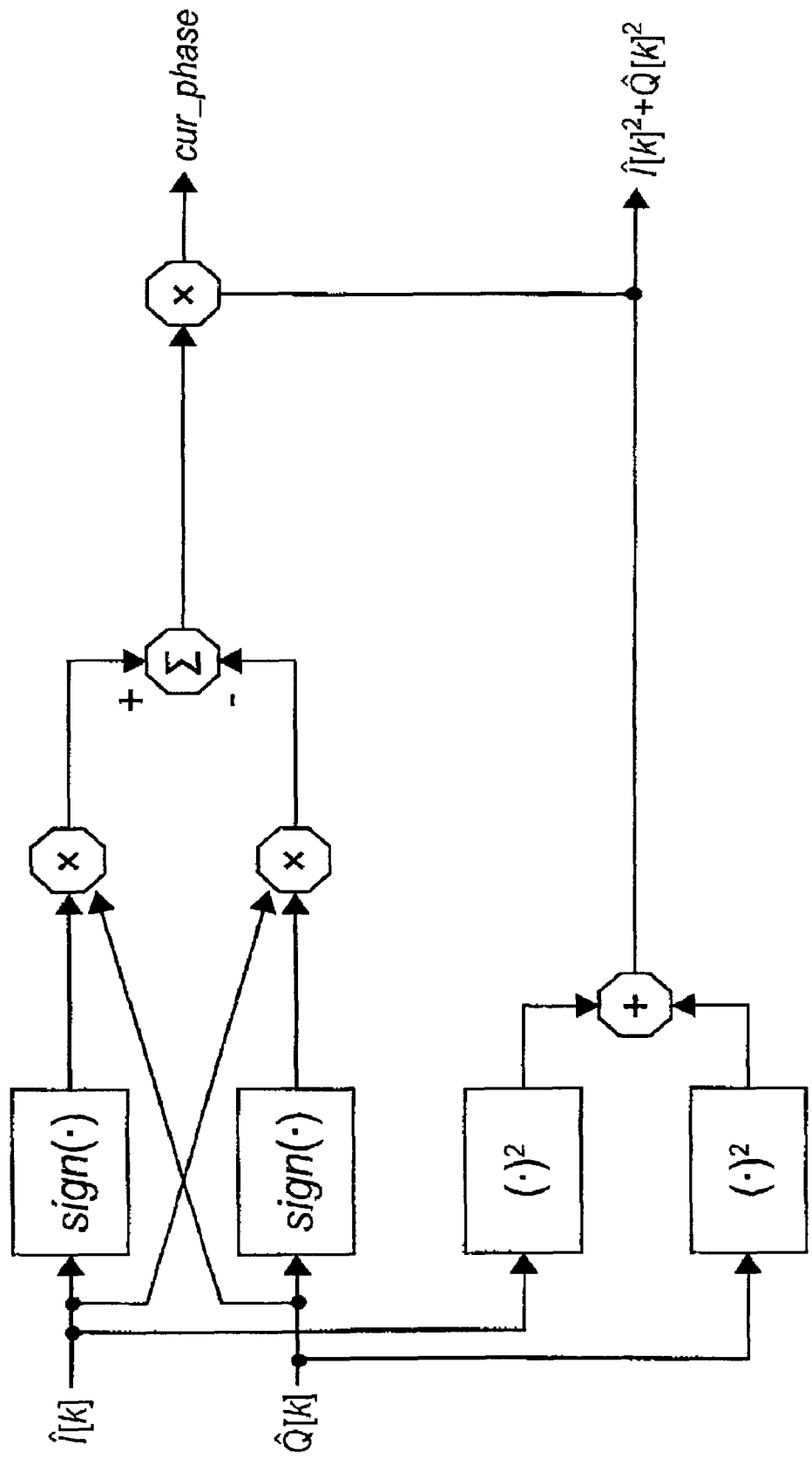
FIG. 5B which is a schematic block diagram showing another preferred embodiment of the phase detector of FIG. 4.

Thus the phase detector 32 sends the phase error cur_phase information to the frequency locker 33 and the phase loop filter 34, and sends the detected symbol energy $\hat{I}[k]^2+\hat{Q}[k]^2$ to the lock controller 32 for further judgment. FIG. 5B shows a simplified phase detector compared to FIG. 5A wherein some mathematic operations are omitted and replaced by a constant value CV.

According to the present invention, the frequency locker 33 and the phase loop filter 34 do not operate at all time. The carrier recovery apparatus according to the present invention operates in three major stages. The first one is an acquisition mode, the second one is a combined acquisition and tracking mode, and the third one is a tracking mode. Suppose that the frequency offset at IF is as large as several tens of kHz while the apparatus starts. In this condition, the signal constellation of in-phase and quadrature rotates seriously, and the estimated $\Delta\theta[k]$ is helpless to compensate the carrier offset. Hence at the first stage, only the frequency locker 33 is activated to derive the information of the frequency offset, and the phase loop filter 34 is disabled by the lock controller 32 at this stage. When the variation of the estimated frequency has been pulled into a smaller range, the phase loop filter 34 joins the active line for fast acquisition. In other words, the frequency locker 33 and the phase loop filter 34 are both active at the second stage. The variation of the estimated frequency must be small while the frequency locker 33 tends to be stable after a period of processing time. The phase loop filter 34 is fine-tuned to compensate the residual phase error. Afterwards, the locker controller 32 turns off the frequency locker 33 to avoid unnecessary vibration of the carrier recovery apparatus, and holds the frequency locker output $\Delta f[k]$ as the previous value. At the third stage, only the phase loop filter 34 is active.

Figure 6:
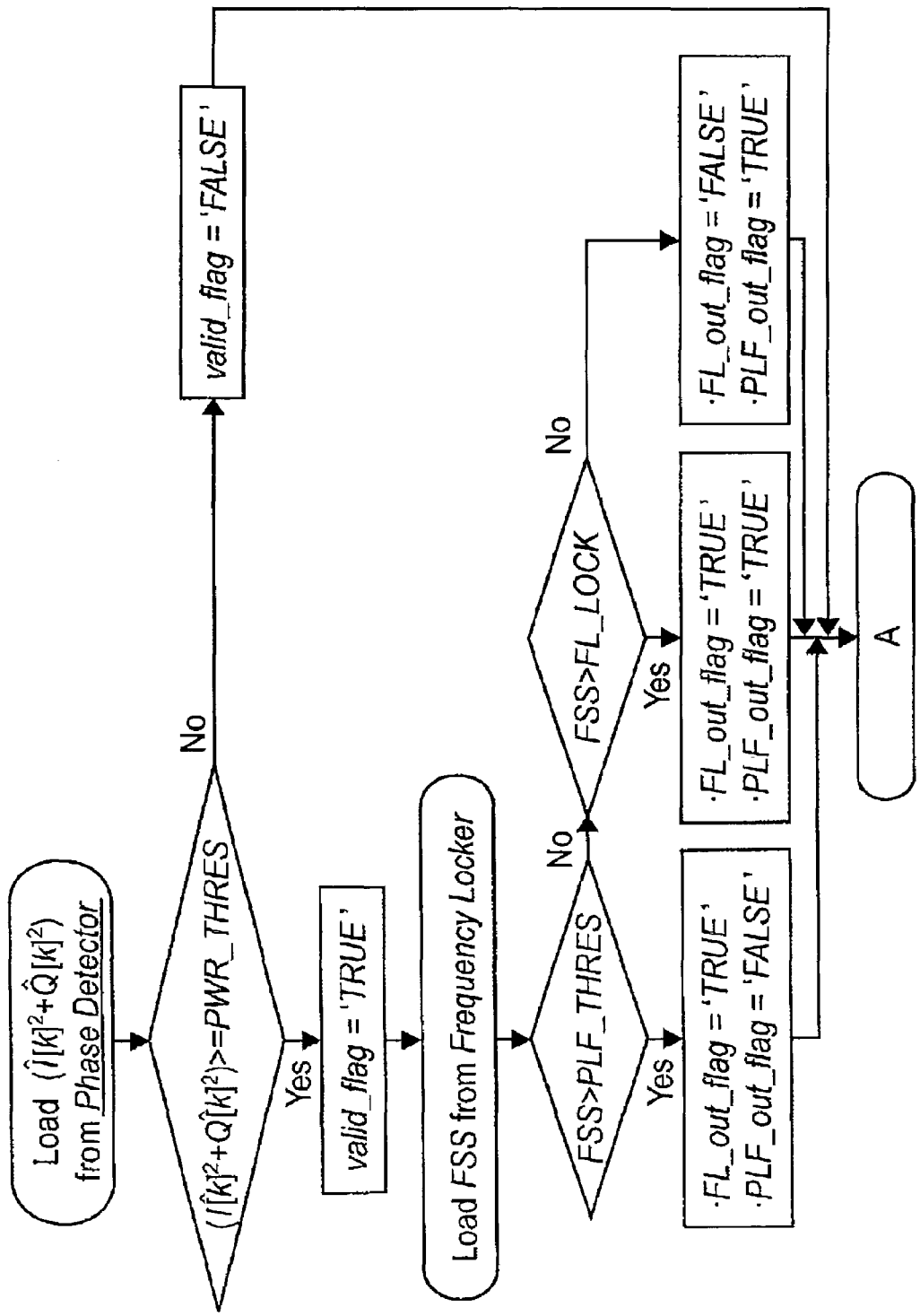
FIG. 6 is a flowchart illustrating the operation rules of the lock controller of FIG. 4.

The flowchart shown in FIG. 6 illustrates the operation rules of the lock controller 32. In the present carrier recovery apparatus, not all extracted symbols ($\hat{I}[k],\hat{Q}[k]$) we adopted to acquire the frequency and phase error information. If the signal energy $\hat{I}[k]^2+\hat{Q}[k]^2$ is smaller than a predetermined threshold value "PWR_THRES", the carrier recovery apparatus keeps $\Delta f[k]$ and $\Delta\theta[k]$ at their previous values. The apparatus enhances the immunity against the additive noise by grouping the symbols whose energies are larger than the defined threshold value.

Figure 7:
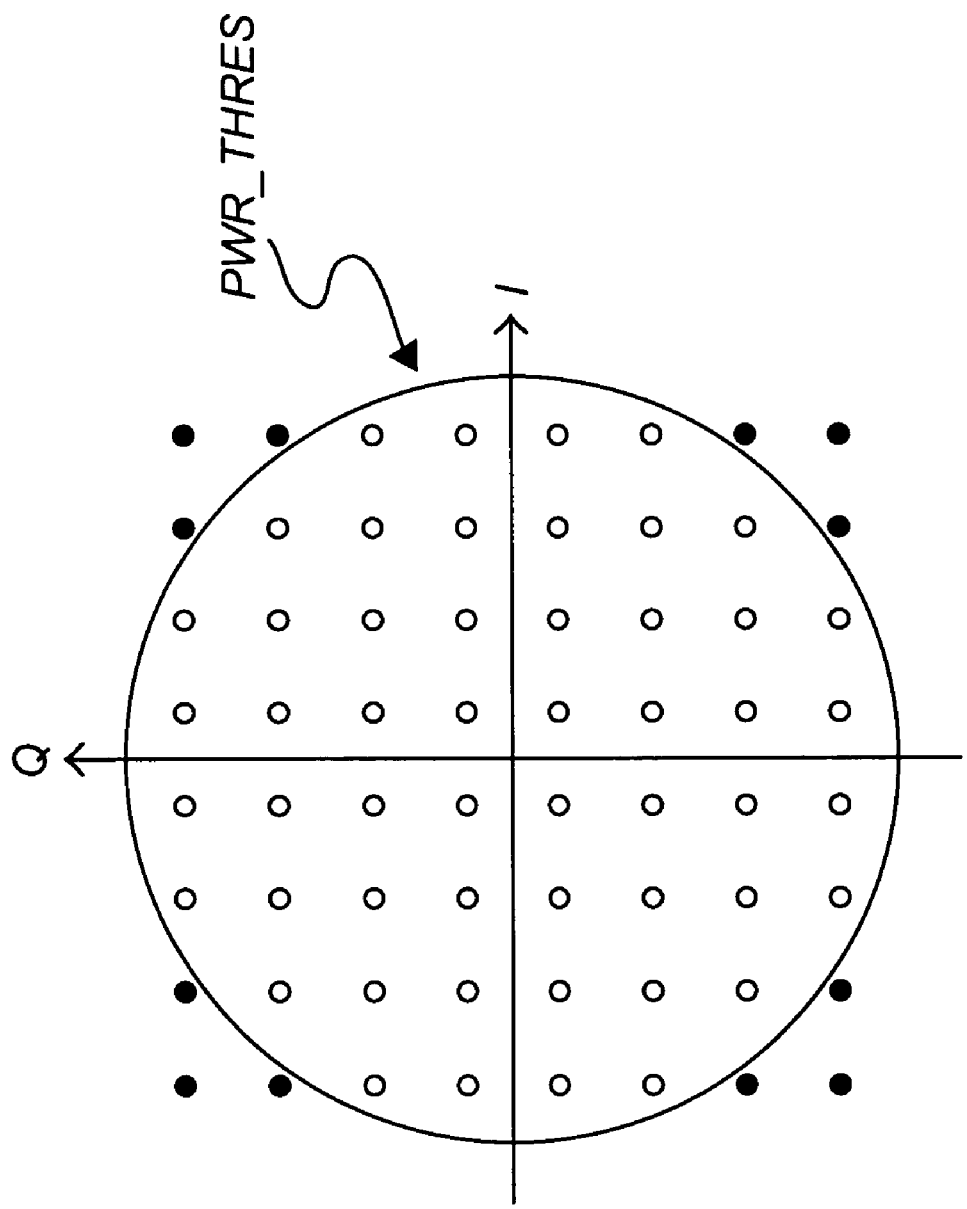
FIG. 7 is a schematic plot showing the constellation of 64-QAM signals and the pre-defined threshold value for the symbol energy detection selected according to the present invention.
Figure 8:
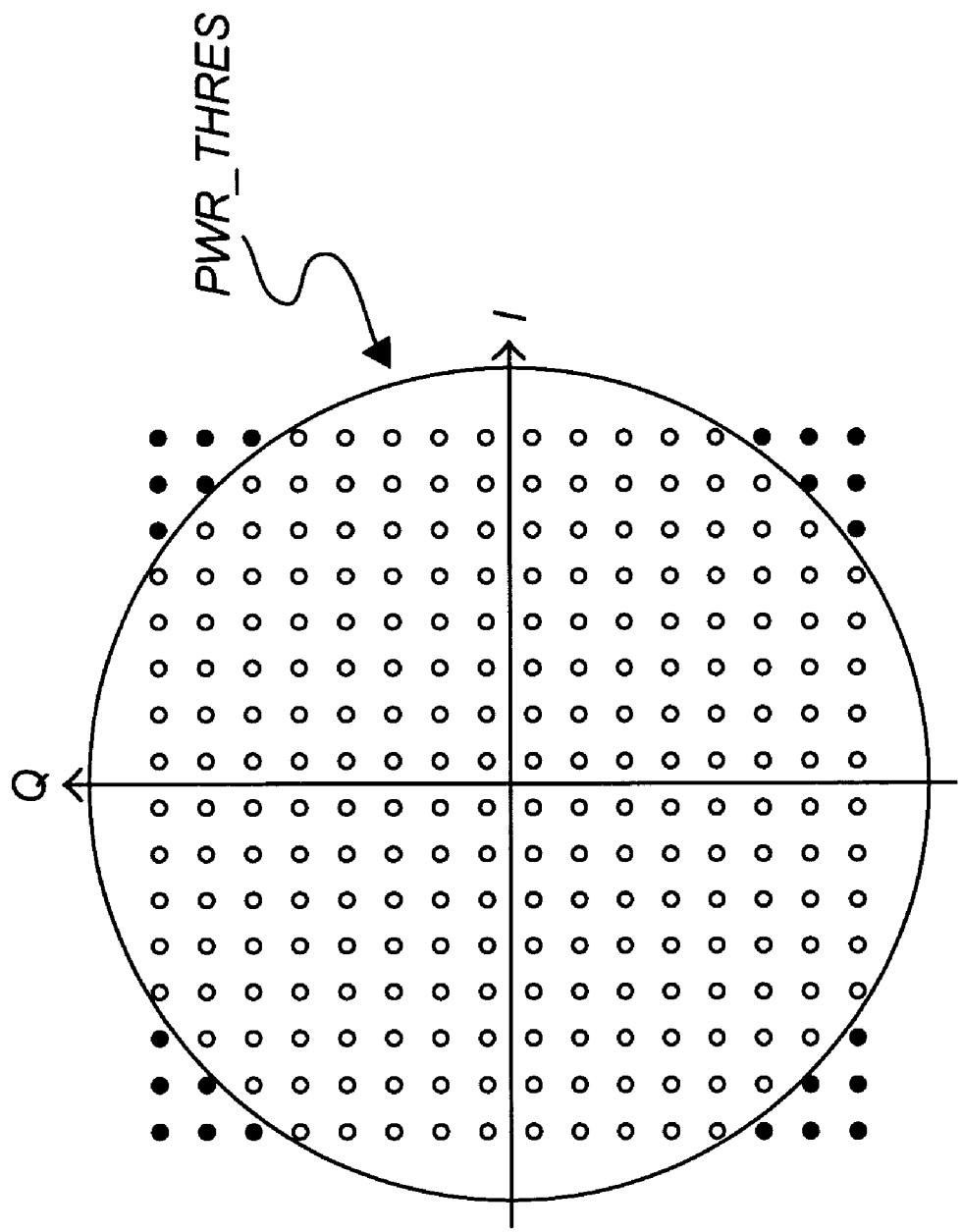
FIG. 8 is a schematic plot showing the constellation of 256-QAM signals and the pre-defined threshold value for the symbol energy detection selected according to the present invention.

Two examples of the threshold value "PWR_THRES" for 64-QAM and 256-QAM are exemplified with reference to FIGS. 7 and 8, respectively. The threshold value "PWR_THRES" is selected so as to allow a proper number of extracted quadrature demodulated symbols $\hat{I}[k]+j\hat{Q}[k]$ around the corner in the constellation to enter into the carrier recovery apparatus. By properly selecting the threshold value "PWR_THRES", relatively quick acquisition can be achieved. As understood by those skilled in the art, the quick acquisition may induce additive noise into the detected phase error, this noise can be filtered out by averaging a sequence of detected phase errors.

Referring to FIG. 6 again, the lock controller 32 accepts the detected symbol energy from the phase detector 31, and will set the control signal "valid_flag" to be "TURE" if the detected symbol energy is larger than the threshold value "PWR_THRES"; otherwise, clear the control signal "valid_flag" to be "FALSE". When the control signal "valid_flag" is "TURE", the three-stage operations as described above are performed. The output of the frequency locker 33, "FSS" is monitored by the lock controller 32, and compared with threshold values "PLF_THRES" and "FL_LOCK" wherein "PLF_THRES" is greater than "FL_LOCK". "FSS" being larger than the pre-defined threshold value "PLF_THRES" means that a large frequency offset still exists between the local NCO and the carrier frequency at IF. In this case, the lock controller 32 forces the carrier recovery apparatus to stay in the acquisition stages and enables the frequency locker 33 by setting the control signal "FL_out_flag" to be "TRUE". The control signal "PLF_out_flag" is now cleared to be "FALSE" to disable the phase loop filter 34. Whenever "FSS" comes to be equal to or smaller than the threshold value "PLF_THRES", but is still larger than another threshold value "FL_LOCK" that is defined to be smaller than "PLF_THRES", the lock controller 32 drives the carrier recovery apparatus into the second operation stage by setting the control signal "PLF_out_flag" to be "TRUE" to enable the phase loop filter 34. If "FSS" is equal to or smaller than the second threshold value "FL_LOCK", the carrier recovery apparatus clears the control signal "FL_out_flag" to be "FLASE" and then enters into the third operation stage, the frequency locker 33 is therefore forced to be turned off.

Figure 9A:
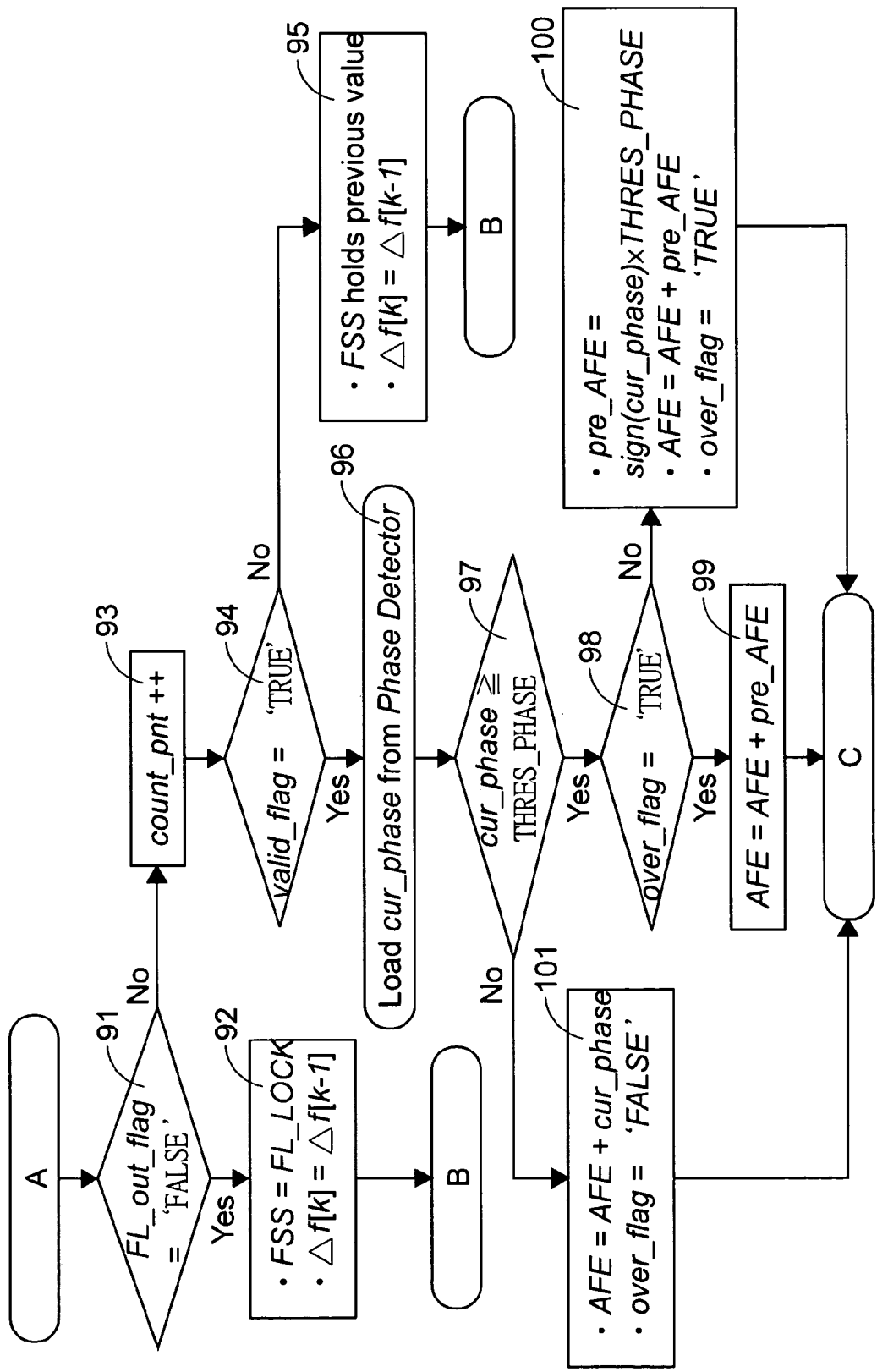
FIGS. 9A and 9B are flowcharts illustrating the operation rule of the frequency locker 33 of FIG. 4.
Figure 9B:
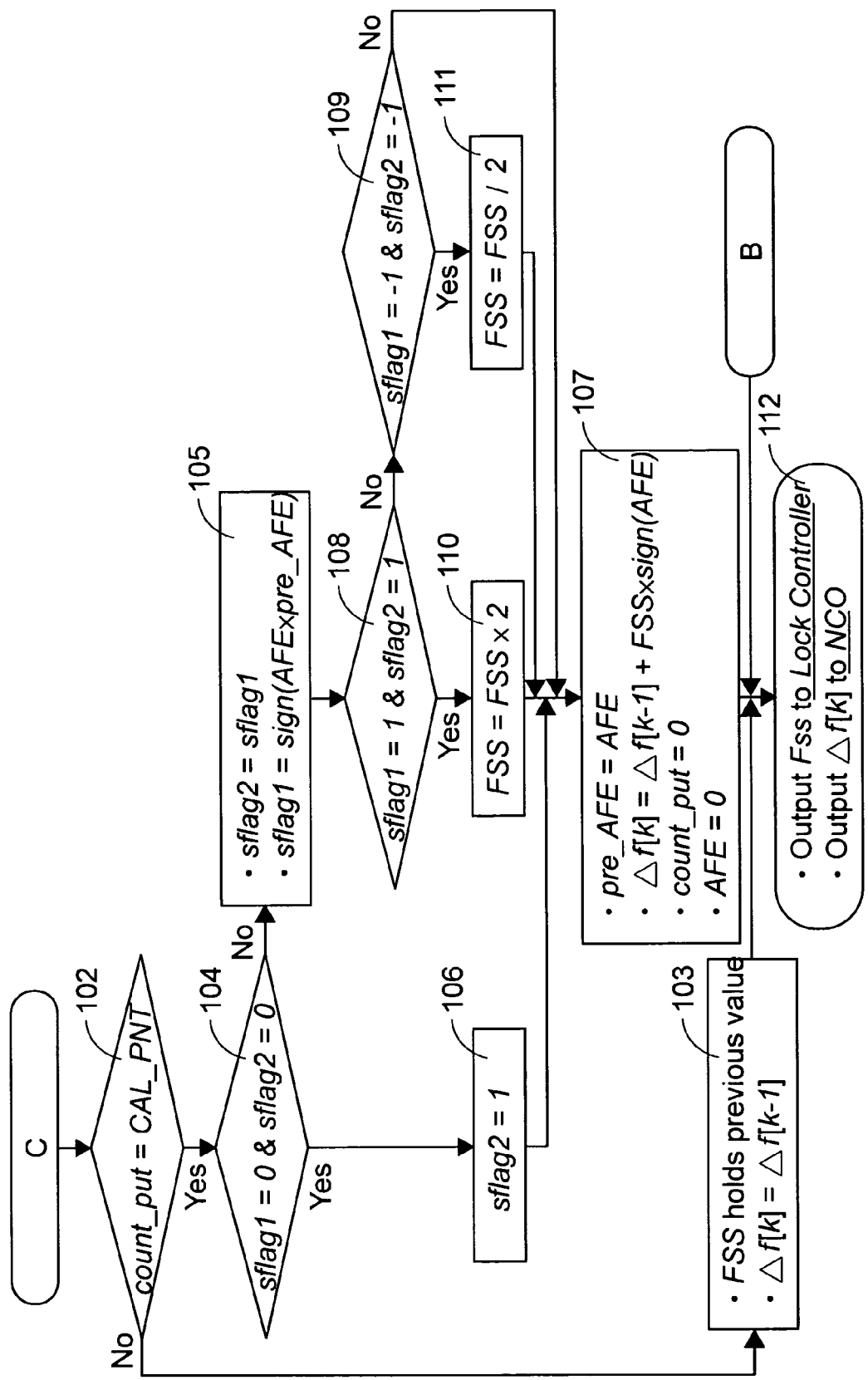

The flowcharts shown in the FIGS. 9A and 9B illustrate the operation rule of the frequency locker 33. Control flags inside the frequency locker 33 are all set to the pre-defined values initially in Step A whenever the carrier recovery apparatus starts. The initial conditions are:

count_pnt=0
over_flag='FALSE'
AFE=0
pre_AFE=0
FSS=FSS_INIT
sflag1=0
sflag2=0
Δf[0]=0

The frequency locker 33 firstly detects the control signal "FL_out_flag" from the lock controller 32 in Step 91. A cleared control signal "FL_out_flag" shows that the frequency locker 33 needs to be turned off in the third operation stage, the adaptive frequency step-size "FSS" will then be set to be the pre-defined threshold value "FL_LOCK" and will be also sent back to the lock controller 32 in Step 92. Meanwhile, the frequency locker 33 holds its output Δf[k] at the previous estimated value. Then, go to step B to output FSS to the lock controller 32. On the other side, when the control signal "FL_out_flag" is set to be "TURE", meaning that the carrier recovery apparatus operates in the first or second stage described above, the output "count_pnt" of a counter 331 included in the frequency locker 33 (FIG. 4) will be carried by one in Step 93. The frequency locker 33 therefore checks the status of the control signal "valid_flag" in Step 94. Go to step C that will be described later if the frequency locker 33 detects a cleared control signal "valid_flag". Otherwise, the function of detecting the frequency offset will be enabled when the "valid_flag" control signal is "TURE".

The detected phase error "cur_phase" is firstly loaded from the phase detector 31 in Step 96. The frequency offset is detected by the following steps.

Step 97. If the absolute value of "cur_phase" is not less than the pre-defined threshold value "THRES_PHASE", go to Step 98; else go to Step 101.

Step 98. Check the control flag "over_flag", which indicates whether the absolute value of "cur_phase" is larger than "THRES_PHASE" or not. Go to Step 99 if "over_flag" is "TRUE", else go to Step 100 if "over_flag" is "FALSE".

Step 99. Update the "AFE" value by adding thereto the "pre_FE" value. Go to Step C.

Step 100. Set "pre_FE" to be the threshold value "THRES_PHASE" with the sign of "cur_phase". Then update "AFE" value with the increment of the "pre_FE" value, and set "over_flag" to be "TRUE". Go to Step C.

Step 101. Update the "AFE" value by adding thereto the "cur_phase" value, and clear "over_flag" to be "FALSE". Go to Step C.

Step C. Adjust the frequency step size FSS and output FSS and Δf[k] as follows.

The frequency locker 33 checks whether or not the value of "count_pnt" reaches the value of "CAL_PNT" in Step 102 of FIG. 9B. If not, maintain the "FSS" and Δf[k] as their original values in Step 103.

Otherwise, update "FSS" and Δf[k] by the following steps.

Step 104. Check whether or not "sflag1" and "sflag2" are both '0'. If not, go to Step 105; else set "sflag2" to be '1' in Step 106, then go to Step 107.

Step 105. Load the value of "sflag1" to "sflag2", and update "sflag1" as the sign of the value of "AFE" multiplied by "pre_AFE". Go to Step 108

Step 108. Check whether "sflag1" and "sflag2" are both '1' or not. If so, meaning that three successive "AFE"s have the same sign, update "FSS" to be twice, then go to Step 107; else go to Step 109.

Step 109. Check whether or not "sflag1" and "sflag2" are both '−1'. If so, meaning that three successive "AFE"s have the opposite signs, divide "FSS" by two in Step 111; else do not change "FSS", and go to Step 107.

Step 107. Load the value of "AFE" to "pre_AFE". Update Δf[k] by the increment value of "FSS" multiplied by the sign of "AFE". Then reset both "count_pnt" and "AFE" to be zero.

The frequency locker 33 sends out "FSS" and "Δf[k]" in Step 112, regardless updated or unchanged, to the lock controller 32 and NCO 23, respectively.

Figure 10:
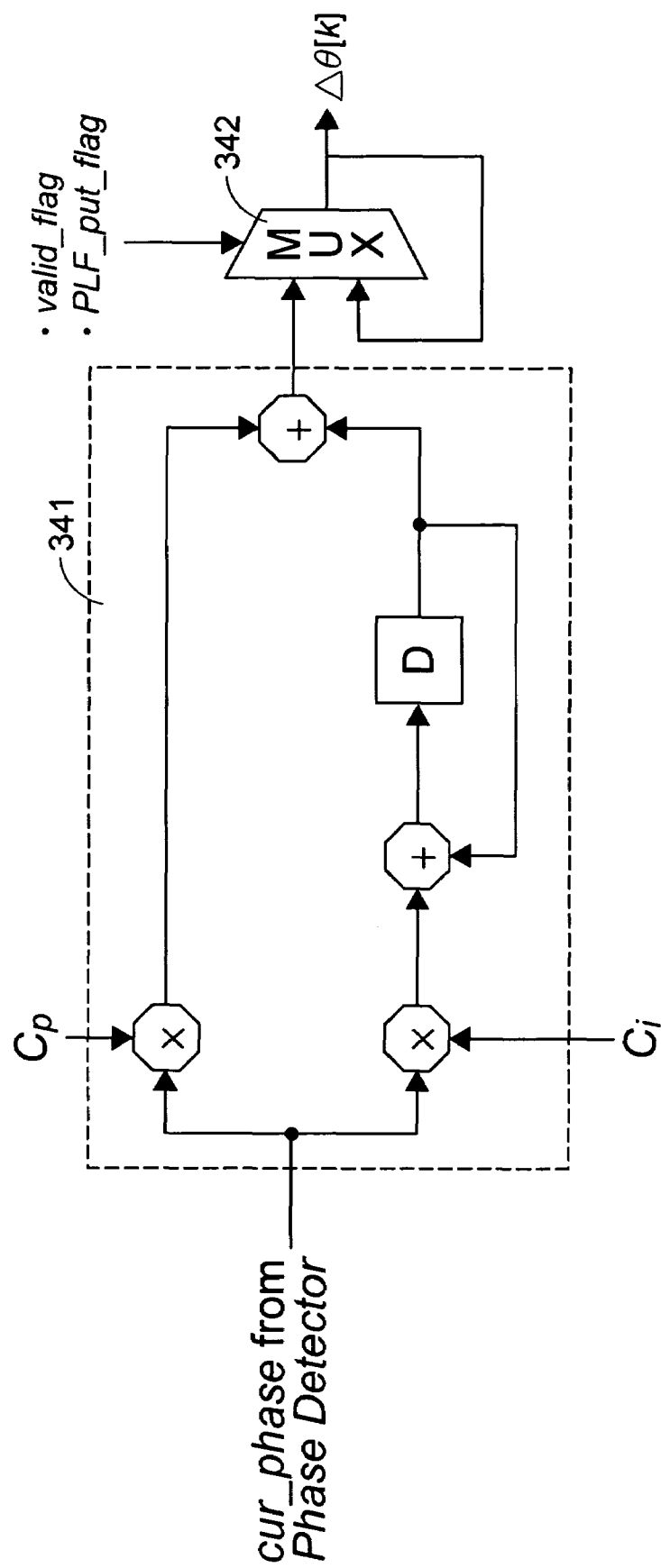
FIG. 10 is a circuit block diagram illustrating the phase loop filter of FIG. 4.

Now refer to FIG. 10 which is a circuit block diagram illustrating the phase loop filter of FIG. 4. The phase loop filter 34 comprises a one-order loop filter 341 and an output multiplexer 342. The multiplexer 342 detects the control signals, "PLF_out_flag" and "valid_flag", from the lock controller 32 to switch the output of the phase loop filter 341 between an updated value and its original value in the last iteration. The operation rule of the phase loop filter 34 will be described with reference to the flowchart of FIG. 11. The parameters "Cp" and "Ci" represent the acquisition bandwidth. The larger "Cp" and "Ci" help faster acquisition, but large vibration occurs. In opposite, the system can converge for a longer time with smaller vibration if smaller "Cp" and "Ci" are chosen. We can choose larger "Cp" and "Ci" at the beginning, and change them into smaller values after a pre-defined processing time to reach both fast acquisition and better tracking performance.

Figure 11:
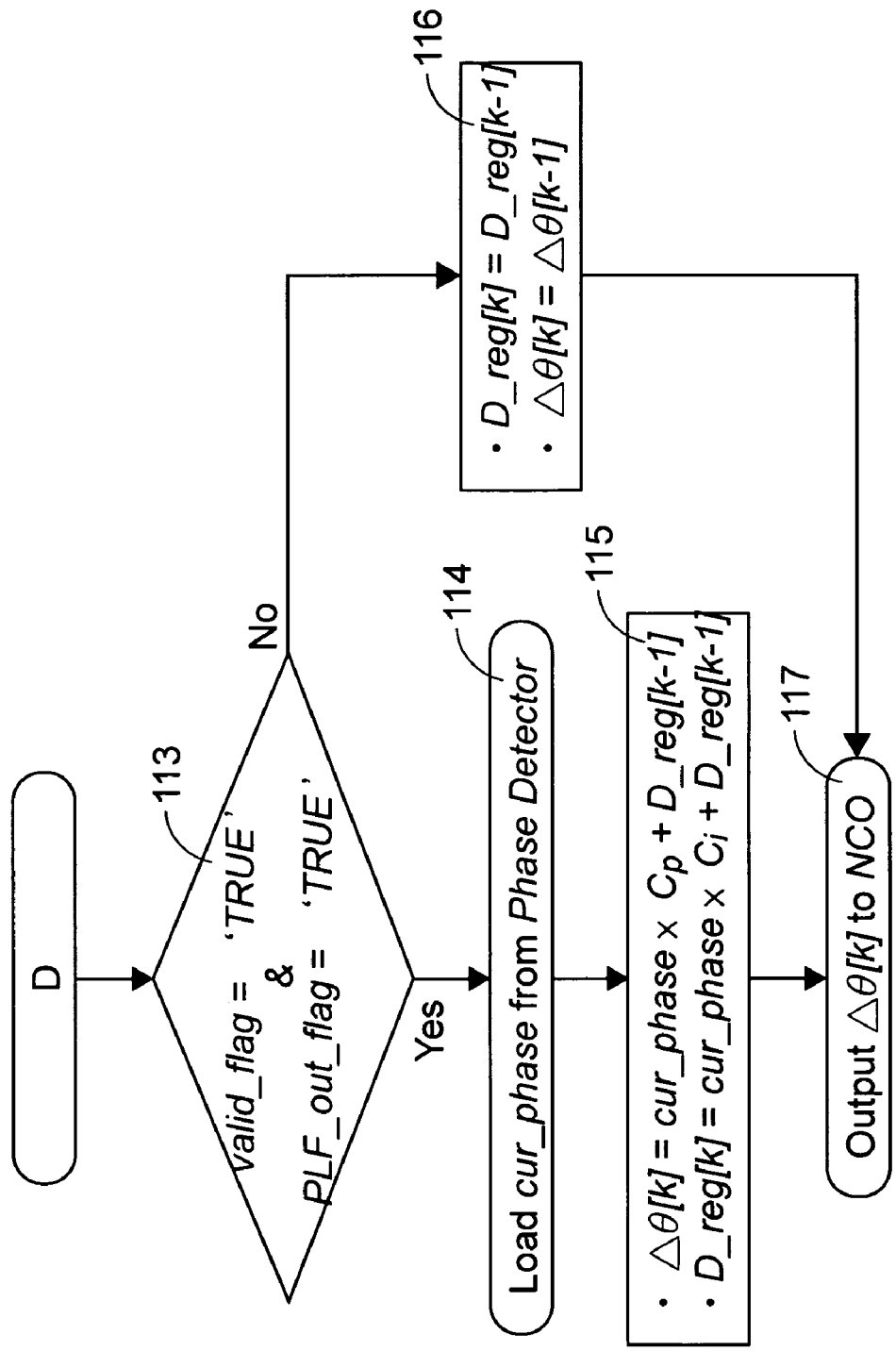
FIG. 11 is a flowchart illustrating the operation rule of the phase loop filter 34 of FIG. 10.

FIG. 11 illustrates the flow chart of the operation of the phase loop filter 34. The flowchart starts from Step D wherein the initial conditions are:

Δθ[0]=0
D_reg[0]=0

The phase loop filter 34 firstly detects the two control flags "valid_flag" and "PLF_out_flag" from the lock controller 32 in Step 113. The control flag "valid_flag" indicates whether or not the extracted symbol is valid and the control flag "PLF_out_flag" indicates whether the phase loop filter 34 should be active or not. When these two control flags are both set to be "TURE", the phase loop filter 34 will update its output by passing the phase error information "cur_phase" to a low-pass filter (not shown) in Steps 114 and 115. This enhances the immunity to additive noise. Otherwise, the phase loop filter 34 will keep its output at the previous value in Step 116 when either "valid_flag" or "PLF_out_flag" is cleared to be "FALSE". Then, the output of the phase loop filter 34 is transmitted to NCO in Step 117.

In conclusion, the carrier recovery apparatus according to the present invention helps the digital QAM receivers to extract non-degraded symbols ($\hat{I}[k],\hat{Q}[k]$), even though suffering large frequency offset and phase offset ($[-\pi, \pi]$). The present invention involves not only a wide lock range but also the ability of fast acquisition. Since the convergence of the phase loop filter described above may cause the phase ambiguity of 0°, 90°, 180°, and 270°, further apparatus is required. Fortunately, this phase ambiguity can be overcome by the prior knowledge of training signals, or a further differential encoding scheme can be applied to reach the ability of rotational invariance in the signal constellation.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A carrier recovery apparatus for use at a demodulating end of a communication system, comprising:
   a phase detector detecting a first and a second components of a signal to be demodulated, and outputting a phase error parameter according to a correlation between said first and second components;
   a frequency locker electrically connected to said phase detector, generating a frequency adjusting value and an estimated frequency error value in response to said phase error parameter; and
   a lock controller electrically connected to said frequency locker, outputting a first flag status signal to said frequency locker according to a comparing result of said frequency adjusting value with a first threshold value, and controlling a changing status of said estimated frequency error value in response to said first flag status signal, said estimated frequency error value being processed according to said changing status and provided for a carrier frequency generator at said demodulating end of said communication system to generate a recovered carrier.

2. The carrier recovery apparatus according to claim 1 wherein said demodulating end of said communication system is a Quadrature Amplitude Modulation (QAM) receiver, said signal to be demodulated is a QAM signal.

3. The carrier recovery apparatus according to claim 2 further comprising an I extractor for extracting an in-phase part of said QAM signal as said first component, and a Q extractor for extracting a quadrature part of said QAM signal as said second component.

4. The carrier recovery apparatus according to claim 3 wherein said phase detector further outputs a power parameter to said locker controller in response to said first and second components of said QAM signal, and outputs a second flag status signal according to a comparing result of said power parameter with a second threshold value, and said second flag status signal indicates a valid status when said power parameter is no less than said second threshold value.

5. The carrier recovery apparatus according to claim 4 wherein said frequency adjusting value is not compared with said first threshold value until said second flag status signal indicates said valid status.

6. The carrier recovery apparatus according to claim 5 further comprising a phase loop filter electrically connected to said phase detector and said lock controller, outputting an estimated phase error value in response to said phase error parameter, and receiving a third flag status signal from said lock controller according to a comparing result of said frequency adjusting value with a third threshold value to control a changing status of said estimated phase error value.

7. The carrier recovery apparatus according to claim 6 wherein said frequency adjusting value is not compared with said third threshold value until said second flag status signal indicates said valid status.

8. The carrier recovery apparatus according to claim 7 wherein said third threshold value is greater than said first threshold value.

9. The carrier recovery apparatus according to claim 8 wherein said first flag status signal indicates an enabled status of said frequency locker when said frequency adjusting value is greater than said first threshold value, and indicates a disabled status of said frequency locker when said frequency adjusting value is no greater than said first threshold value.

10. The carrier recovery apparatus according to claim 9 wherein said third flag status signal indicates an enabled status of said phase loop filter when said frequency adjusting value is no greater than said third threshold value, and indicates a disabled status of said frequency locker when said frequency adjusting value is greater than said third threshold value.

11. The carrier recovery apparatus according to claim 10 wherein said changing status of said estimated frequency error value indicates that said estimated frequency error value holds at a previous value when said first flag status signal indicates said disabled status of said frequency locker.

12. The carrier recovery apparatus according to claim 11 wherein said changing status of said estimated frequency error value indicates that said estimated frequency error value is updated by incorporating therein a factor of said frequency adjusting value when said first flag status signal indicates said enabled status of said frequency locker.

13. The carrier recovery apparatus according to claim 12 wherein said frequency locker further outputs an average frequency error according to a comparing result of said phase error parameter with a fourth threshold value.

14. The carrier recovery apparatus according to claim 13 where said frequency locker includes a counter and generates said estimated frequency error value in response to said frequency adjusting value and a sign of said average frequency error while said counter counts up to a pre-defined value.

15. The carrier recovery apparatus according to claim 13 wherein said frequency adjusting value is doubled when three consecutive average frequency errors outputted by said phase detector have the same sign, and reduced to a half when said three consecutive average errors have alternate signs.

16. The carrier recovery apparatus according to claim 15 wherein said changing status of said estimated phase error value indicates that said estimated phase error value holds at a previous value when said third flag status signal indicates said disabled status of said phase loop filter.

17. The carrier recovery apparatus according to claim 13 wherein said changing status of said estimated phase error value indicates that said estimated phase error value is updated by incorporating therein a factor of an acquisition bandwidth inputted into said phase loop filter when said third flag status signal indicates said enabled status of said phase loop filter.

18. The carrier recovery apparatus according to claim 17 wherein said phase loop filter includes:
   a one-order filter electrically connected to said phase detector for receiving said phase error parameter, and processing said phase error parameter and said acquisition bandwidth into an updated estimated phase error value; and a multiplexer electrically connected to said one-order filter, and allowing one of said held estimated phase error value and said updated estimated phase error value to be outputted in response to said second and third flag status signals.

19. The carrier recovery apparatus according to claim 1 wherein said carrier frequency generator is a numerically controlled oscillator (NCO).

20. A carrier recovery apparatus for use in a Quadrature Amplitude Modulation (QAM) receiver, comprising:
  a phase detector outputting a phase error parameter in response to an in-phase and a quadrature components of a QAM signal;
  a frequency locker electrically connected to said phase detector, generating a frequency adjusting value and an estimated frequency error value in response to said phase error parameter;
  a phase loop filter electrically connected to said phase detector, outputting an estimated phase error value in response to said phase error parameter; and
  a lock controller electrically connected to said frequency locker and said phase loop filter, outputting a first flag status signal to said frequency locker according to a comparing result of said frequency adjusting value with a first threshold value, and outputting a second flag status signal to said phase loop filter according to a comparing result of said frequency adjusting value with a second threshold value in order to control a first changing status of said estimated frequency error value in response to said first flag status signal, and control a second changing status of said estimated phase error value in response to said second flag status, wherein said estimated frequency error value and estimated phase error value are processed according to said first and second changing status, respectively, and provided for a carrier frequency generator at said QAM receiver to generate a recovered carrier.

21. The carrier recovery apparatus according to claim 20 wherein said phase detector further outputs a power parameter to said locker controller in response to said in-phase and quadrature components of said QAM signal, and outputs a third flag status signal according to a comparing result of said power parameter with a third threshold value, said third flag status signal indicates a valid status when said power parameter is no less than said third threshold value, and said frequency adjusting value is not compared with said first threshold value until said third flag status signal indicates said valid status.

* * * * *